US007745755B2

(12) United States Patent
Madar et al.

(10) Patent No.: US 7,745,755 B2
(45) Date of Patent: Jun. 29, 2010

(54) METHOD OF PROCESSING POSTAL ARTICLES FOR MAKING UP AND SEPARATING DELIVERY ROUNDS

(75) Inventors: François Madar, Bourg-les-Valence (FR); Bruno Cartal, Montelier (FR); Nicolas Basset, Saint Paul Trois Chateaux (FR)

(73) Assignee: Solystic, Gentilly Cedex (FR)

( * ) Notice: Subject to any disclaimer, the term of this patent is extended or adjusted under 35 U.S.C. 154(b) by 661 days.

(21) Appl. No.: 11/184,857

(22) Filed: Jul. 20, 2005

(65) Prior Publication Data

US 2006/0016734 A1 Jan. 26, 2006

(30) Foreign Application Priority Data

Jul. 23, 2004 (FR) .................................. 04 51638

(51) Int. Cl.
*G06K 9/00* (2006.01)

(52) U.S. Cl. ...................... 209/584; 209/630; 209/900; 198/357; 198/465.1

(58) Field of Classification Search ................. 209/546, 209/900, 584; 198/465.1
See application file for complete search history.

(56) References Cited

U.S. PATENT DOCUMENTS

| | | | | |
|---|---|---|---|---|
| 5,009,321 | A * | 4/1991 | Keough | 209/3.1 |
| 6,501,041 | B1 * | 12/2002 | Burns et al. | 209/584 |
| 6,513,641 | B1 * | 2/2003 | Affaticati et al. | 198/357 |
| 6,881,916 | B2 * | 4/2005 | McLaughlin et al. | 209/584 |
| 7,012,211 | B2 * | 3/2006 | Brinkley et al. | 209/584 |
| 7,156,220 | B2 * | 1/2007 | Olson et al. | 198/465.1 |
| 7,259,345 | B2 * | 8/2007 | Kechel | 209/584 |
| 2002/0125177 | A1 * | 9/2002 | Burns et al. | 209/630 |
| 2004/0016623 | A1 | 1/2004 | Olson et al. | |
| 2004/0040898 | A1 * | 3/2004 | Kechel | 209/584 |
| 2005/0279674 | A1 * | 12/2005 | Gillet | 209/584 |

FOREIGN PATENT DOCUMENTS

| | | | |
|---|---|---|---|
| FR | 2 738 506 | A | 3/1997 |
| WO | WO 02/076635 | A | 10/2002 |

* cited by examiner

*Primary Examiner*—Patrick Mackey
*Assistant Examiner*—Terrell H Matthews
(74) *Attorney, Agent, or Firm*—Sughrue Mion, PLLC

(57) ABSTRACT

The method of handling mail items for preparing delivery rounds in a postal sorting machine having sorting outlets with interchangeable trays, in which in order to separate the mail items of two delivery rounds at one sorting outlet, the machine causes a tray to be changed at said sorting outlet.

5 Claims, 1 Drawing Sheet

First pass

| S1 | S2 | S3 |
|---|---|---|
| 1 | 2 | 3 |
| 4 | [5] | [6] |
| [7] | [8] | [9] |

Second pass

| S1 | S2 | S3 |
|---|---|---|
| 1 | 4 | [7] |
| 2 | [5] | [8] |
| 3 | [6] | [9] |

METHOD OF PROCESSING POSTAL ARTICLES FOR MAKING UP AND SEPARATING DELIVERY ROUNDS

The present invention relates to a method of handling mail items for preparing and separating delivery rounds or "postmen's walks" in a postal sorting machine.

The invention applies more particularly to a method of handling mail items implemented in a postal sorting machine including a bin carrousel traveling above the sorting outlets of the machine, each sorting outlet being equipped with a removable tray that is interchangeable automatically on command from the sorting system. The method of handling mail items can, for example, be implemented in a machine known from Patent Application US 2004/0016623.

BACKGROUND OF THE INVENTION

Simultaneously preparing a plurality of delivery rounds or "sequencing" in a sorting machine is a well known process. Simultaneously preparing a plurality of delivery rounds on the same sorting machine raises the problem of separating the delivery rounds.

In order to separate two delivery rounds, it is known that mail items inserted into the machine can be sorted in a first sorting pass by using "virtual" delivery points (delivery points that do not exist and that are assigned to respective sorting outlets of the machine). That technique suffers from the drawback of limiting the sorting capacity of the machine as regards the number of delivery points that can be handled in a second pass for preparing delivery rounds.

In another known method of handling mail items for preparing delivery rounds, the mail items of two different delivery rounds are separated by shifting sorting outlets in the second sorting pass, i.e. the delivery points of one delivery round are assigned sorting outlets that are different from the sorting outlets assigned to the delivery points of another delivery round. That technique also suffers from the drawback of limiting the sorting capacity of the machine as regards the number of delivery points that can be handled in the second pass for preparing delivery rounds.

In another known method of handling mail items for preparing delivery rounds, colored separator boards are used to separate the items of different rounds physically. With that method, the delivery points of the delivery rounds are concatenated in the sorting outlets of the machine, i.e. they are put one after another in the sorting outlets (the last delivery point of one delivery round being followed directly by the first delivery point of the following delivery round in the same sorting outlet) and two adjacent mail items in the same sorting outlet that correspond to different delivery rounds are separated by a separator board. With that technique, if N1 is the number of sorting outlets of the machine that are used in the first pass, and N2 is the number of sorting outlets of the machine that are used in the second pass, it is possible to sort N1×N2 delivery points in the second pass. The use of separator boards gives rise to additional costs through loss of throughput (additional object to be handled, manipulations by the operator, etc.). Nevertheless, that solution is in use for objects stood on edge but it is unsuitable for objects laid flat (impossible to locate a separator).

OBJECTS AND SUMMARY OF THE INVENTION

An object of the present invention is to propose a method of handling mail items as indicated above that makes it possible to sort N1×N2 delivery points in the second pass with the delivery rounds being physically separated more simply.

To this end, the invention provides a method of handling mail items for preparing delivery rounds in a postal sorting machine, which method consists in preparing at least two delivery rounds in sorting outlets provided with interchangeable trays, and in directing a mail item of a first delivery round and a mail item of a second delivery round towards a common sorting outlet, wherein, for separating the mail items of the two delivery rounds at said common sorting outlet, the machine causes a tray to be changed in said common sorting outlet.

In one implementation of the method of the invention, the method further consists in checking whether the delivery round corresponding to a current mail item for directing to a sorting outlet is different from the current delivery round corresponding to the last mail item to be loaded in said sorting outlet, and in causing a tray to be changed in said sorting outlet if there are two delivery rounds to be separated.

In another implementation of the method of the invention, the method further consists in checking whether the last mail item to be loaded in a sorting outlet corresponds to a delivery round that is different from the delivery round corresponding to a next mail item to be loaded in said sorting outlet, and in causing a tray to be changed in said sorting outlet if there are two delivery rounds to be separated.

The invention also provides a postal sorting machine that is specially arranged to implement the method defined above.

BRIEF DESCRIPTION OF THE DRAWING

The invention will be better understood on reading the following description and on examining the figures that accompany it. The description is given merely by way of indication and is in no way limiting to the invention.

In the figures.

MORE DETAILED DESCRIPTION

The mail-handling method of the invention for preparing delivery rounds in an automatic sorting machine having a bin carrousel enables mail items corresponding to different delivery rounds to be separated physically without affecting the sorting capacity of the machine.

The method of the invention makes advantageous use of devices that exist in a sorting machine having a bin carrousel and that serve to change a full tray automatically by replacing it with an empty tray at a respective one of the sorting outlets of the machine.

Figure 1:
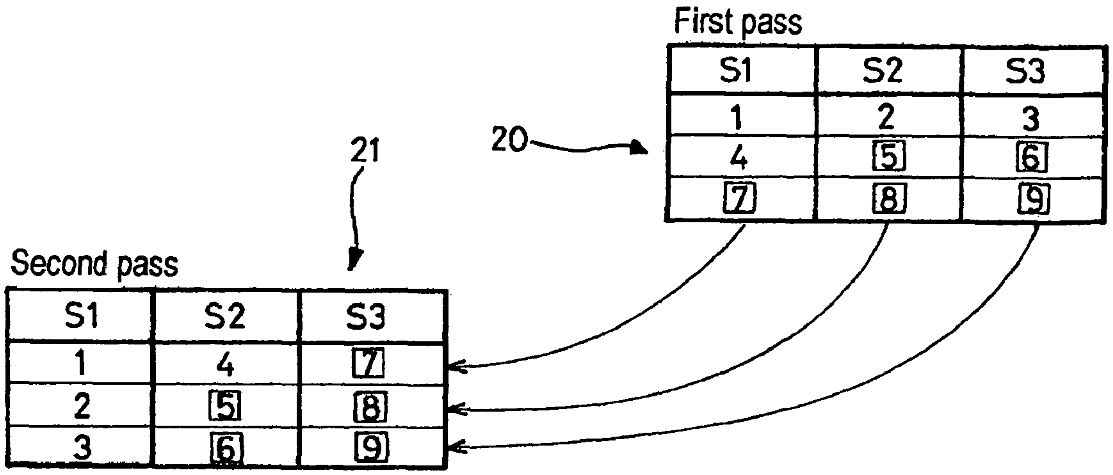
FIG. 1 is a very diagrammatic view of a two-pass sorting plan implemented in the method of the invention.

By way of a simplified explanatory example of the method of the invention, FIG. 1 shows a first distribution 20 of nine delivery points numbered 1 to 9 for mail items to be sorted in a first pass into three sorting outlets S1, S2, S3 of an automatic sorting machine (not shown).

A second distribution of nine delivery points is shown at 21 for mail items to be sorted in a second pass into the three sorting outlets S1, S2, S3.

These two distributions 20 and 21 correspond to a two-pass sorting plan programmed into the sorting machine.

In this sorting plan, the delivery points of the delivery rounds are concatenated. More particularly, for the first sorting pass, the delivery points of all of the delivery rounds are distributed in the order of each round successively over N1 sorting outlets modulo N1 (N1 being equal to 3 in the example). For the second sorting pass, the delivery points assigned to each sorting outlet in the first pass are distributed over N2 sorting outlets (N2 being 3 in the example) in order to concatenate the delivery points of the delivery rounds as shown in FIG. 1.

With this sorting plan configuration, it is thus possible to sort N1×N2 delivery points (nine delivery points in this example) for preparing delivery rounds using the method of the invention, without the machine suffering any loss of sorting capacity.

In the simple example shown in FIG. 1, there are two delivery rounds made up respectively of delivery points 1, 2, 3, 4 for the first round and of delivery points 5, 6, 7, 8, 9 (in boxes in FIG. 1) for the second round.

During the first sorting pass, the mail items whose postal addresses correspond to respective ones of the delivery points 1, 4 and 7 are directed towards the outlet S1, the mail items whose postal addresses correspond to respective ones of the delivery points 2, 5, and 8 are directed to the outlet S2, and finally the mail items whose postal addresses correspond to respective ones of the delivery points 3, 6, and 9 are directed to the outlet S3.

At the end of the first sorting pass, the trays in the sorting outlets are emptied while being kept in order and the mail items are reinserted into the sorting machine for the second sorting pass. In particular, the content of the tray in the outlet S3 obtained in the first sorting pass is inserted first, and the mail items assigned to the delivery points 3, 6, and 9 are then sorted respectively into the sorting outlets S1, S2, and S3 in the second pass. The content of the tray of the outlet S2 obtained in the first sorting pass is then inserted into the machine for the purpose of sorting the mail items whose delivery points are the delivery points 2, 5, and 8. Finally, the content of the tray of the outlet S1 in the first sorting pass is inserted into the machine for the purpose of sorting the mail items whose delivery points are the delivery points 1, 2, and 3. This process can be assisted by a device for transferring trays going from the sorting outlets to the inlet of the sorting machine.

As appears in FIG. 1, in the second pass, some mail items that are parts of different delivery rounds are directed to the same sorting outlet. In particular, the mail items assigned to the delivery point 4 are directed to the tray of the outlet S2 as are the mail items assigned to delivery point 5.

In the method of the invention, for the purpose of physically separating mail items of the two rounds in the second pass, a tray is automatically changed in the outlet S2 between the moment when the last mail item having the delivery point 5 is loaded into the outlet S2 and the moment when the first mail item having the delivery point 4 is loaded into the outlet S2, and more particularly when it is detected that the two mail items that are to be loaded consecutively into said sorting outlet S2 correspond to two different rounds.

In one implementation of the method, a tray is caused to be changed in the outlet S2 when the first current mail item having the delivery point 4 is presented to the outlet S2, because the delivery round of that item is different from the delivery round of the last mail item to be presented to the outlet S2, which has the delivery point 5.

More generally, in the method of the invention, in the second pass, the delivery round of a current mail item for directing to a certain sorting outlet and the current delivery round of the last mail item to be loaded into the sorting outlet are checked. When the delivery round of the current mail item is different from the current delivery round for the sorting outlet in question, the sorting system causes a tray to be changed in said sorting outlet. The change of tray is naturally synchronized with the arrival of the current mail item into the sorting outlet in question. In this way, the two delivery rounds are separated physically at said sorting outlet.

This principle can be generalized for any sorting outlet to which delivery points corresponding to different rounds are assigned in the second pass.

In practice, during the second pass, and for each sorting outlet of the machine, a current delivery round identifier is stored in a memory, which identifier is data representative of the delivery round corresponding to the last mail item to be loaded in the sorting outlet. For each current mail item presented in the second pass in the machine, identification is performed to identify the corresponding delivery round and the sorting outlet to which it is to be directed. The delivery round of the current mail item is compared with the current delivery round of the sorting outlet in question, and when they are different, the tray is caused to be changed.

The detection indicated above can be performed in other manners without going beyond the ambit of the invention. For example, in another implementation of the method, it is possible to save the order in which the mail items are inserted in the first pass and, on the basis of the sorting plan (assignment of the delivery points to the sorting outlets in the first pass and in the second pass), it is possible to identify any particular mail item which, by being directed to a sorting outlet in the second pass, should automatically trigger a change of tray. More particularly, said mail item is the last mail item that is to be loaded into said outlet for one delivery round, while the next mail item that is to be directed to said sorting outlet corresponds to another delivery round. Said item being passed through the machine can be detected easily in the second pass by reading its identity bar code, for example, or by any other equivalent means for identifying the delivery point of the mail item.

Figure 2:
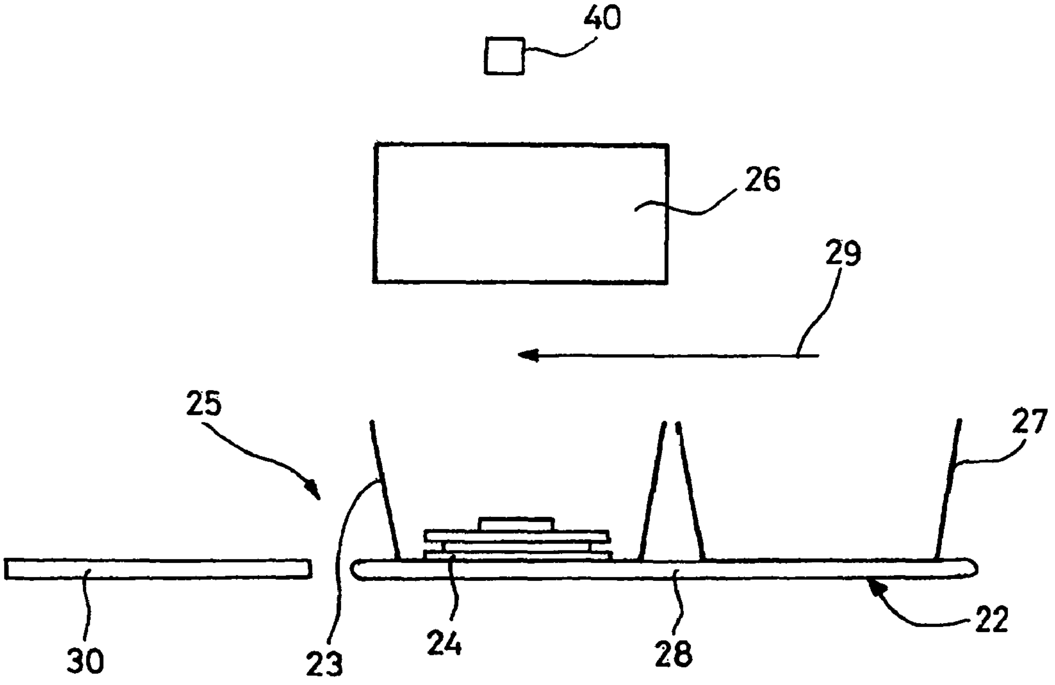
FIG. 2 is a very diagrammatic section view of a tray-changing device for implementing the method of the invention.

FIG. 2 is a very diagrammatic section view of a device for automatically changing a full tray by replacing it with an empty tray in a sorting outlet. It should be noted that the sorting outlets of an automatic sorting machine fed via a bin carrousel are, generally, already equipped with interchangeable trays and with automatic tray-changing devices such as 22 which, in a sorting outlet 25 placed under the bin carrousel 26, replaces a tray 23 full of mail items 24 with a replacement empty tray 27.

The tray-changing device shown in FIG. 2 comprises a conveyor 28 which is disposed under the sorting outlet 25 and which is arranged in a manner such as to drive two adjacent trays 23, 27 in the direction indicated by arrow 29 so as to place the full tray 23 on a conveyor 30 for removing trays, and so as to place the empty tray 27 in place of the tray 23 in the sorting outlet 25.

A tray transfer device (not shown in FIG. 2) can be provided for re-stocking the sorting outlet 25 with another replacement empty tray 27 after a tray-changing operation.

The automatic tray-changing device used above is, for example, an element of an Automated Tray Handling System (ATHS). Such a system further includes tray conveyor devices for returning trays that are filled with mail items to the inlet of the sorting machine after the first pass, for bringing empty trays to face the sorting outlets, and also for conveying trays and managing the order in which they are stored when they are removed from the sorting outlets by using a labeling and label-reading system.

Instead of such an ATHS, it is possible to provide visual indicators, e.g. indicator lights, disposed on respective ones of the sorting outlets so as to be visible to an operator. The machine causes a visual indicator 40 of a sorting outlet to operate in order to indicate to the operator that a tray needs to be changed in said sorting outlet in order to separate two delivery rounds. The operator, guided by the signal given by the indicator, changes the tray in said sorting outlet by hand. The change of tray can be detected automatically by a sensor in the machine in order to switch over the indicator automatically afterwards. It is also possible to use audible indicators in place of visual indicators without going beyond the ambit of the invention.

What is claimed is:

1. A method of handling mail items for sequencing simultaneously a plurality of delivery rounds in a sorting machine having N1 sorting outlets with interchangeable trays, each mail item having a postal address corresponding to a delivery point in one of said delivery rounds and each delivery round having a plurality of delivery points, said method comprising the steps of programming said sorting machine by assigning said N1 sorting outlets to said delivery points of said delivery rounds according to a certain sorting plan including a first and a second sorting pass and sorting said mail items towards said N1 sorting outlets by performing said first and second sorting pass, wherein said method further comprises the steps of:

assigning said N1 sorting outlets to said delivery points according to a modulo N1 distribution, said plurality of delivery points of said plurality of delivery rounds being concatenated for performing said distribution, and during the second sorting pass of said mail items, detecting whether a first and a second mail item to be sorted consecutively towards a common sorting outlet correspond respectively to two different delivery rounds and in response to said detection, triggering a change of tray into said common sorting outlet to load said first mail item in a first tray of said common sorting outlet and said second mail item in a second tray of said common sorting outlet different from said first tray.

2. The method according to claim 1, comprising the steps of:

storing in a memory, current delivery round identifiers associated respectively to said sorting outlets, each delivery round identifier associated to a sorting outlet being representative of a last delivery round corresponding to a last mail item loaded in said sorting outlet, directing a current mail item towards a certain sorting outlet and identifying a current delivery round corresponding to said current mail item, checking that said current delivery round corresponds to the delivery round identifier of said certain sorting outlet, and if said current delivery round corresponds to said certain sorting outlet delivery round identifier, triggering a change of tray in said certain sorting outlet to bring an empty tray in said certain sorting outlet in which said current mail item is loaded.

3. The method according to claim 2, wherein the change of tray in said certain sorting outlet is synchronized with the arrival of the current item in this sorting outlet.

4. The method of claim 1, wherein said triggering of change of tray in a sorting outlet includes triggering a visual or audible indicator associated to said sorting outlet.

5. A postal machine for carrying out the method of claim 1 comprising a bin carrousel for feeding said sorting outlets with postal items and an automatic tray-changing system for changing in each sorting outlet a tray filled with mail items by an empty tray.

* * * * *